(12) United States Patent
Herden et al.

(10) Patent No.: US 8,649,921 B2
(45) Date of Patent: Feb. 11, 2014

(54) METHOD AND ELECTRONIC DEVICE FOR MONITORING THE STATE OF COMPONENTS OF RAILWAY VEHICLES

(75) Inventors: Marc-Oliver Herden, Munich (DE); Ulf Friesen, Neubiberg (DE); Michael Amft, München (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 113 days.

(21) Appl. No.: 13/389,702

(22) PCT Filed: Aug. 6, 2010

(86) PCT No.: PCT/EP2010/061469
§ 371 (c)(1),
(2), (4) Date: Apr. 19, 2012

(87) PCT Pub. No.: WO2011/018416
PCT Pub. Date: Feb. 17, 2011

(65) Prior Publication Data
US 2012/0197483 A1    Aug. 2, 2012

(30) Foreign Application Priority Data
Aug. 14, 2009  (DE) .......................... 10 2009 037 637

(51) Int. Cl.
*B61L 25/02* (2006.01)
(52) U.S. Cl.
USPC .......................... 701/19; 701/34.4; 246/122 R
(58) Field of Classification Search
USPC .................. 701/19, 20, 32.3, 34.4; 246/122 R
See application file for complete search history.

(56) References Cited

U.S. PATENT DOCUMENTS

| | | | |
|---|---|---|---|
| 6,246,950 B1 * | 6/2001 | Bessler et al. | 701/99 |
| 6,498,969 B2 | 12/2002 | Alacoque et al. | |
| 6,860,210 B2 * | 3/2005 | Baier | 105/167 |
| 7,283,897 B2 * | 10/2007 | Kane et al. | 701/19 |
| 7,593,795 B2 * | 9/2009 | Kane et al. | 701/19 |

(Continued)

FOREIGN PATENT DOCUMENTS

| | | |
|---|---|---|
| DE | 19529986 A1 | 2/1997 |
| DE | 19836081 A1 | 2/2000 |

(Continued)

OTHER PUBLICATIONS

Wiltschko et al.; Bordautonome Ortung von Schienenfahrzeugen mit Map-Matching-Technologie / Board-Autonomous Train Positioning by Map-Matching Technology; Zevrail—Glasers Annalen; Jun. 1, 2005; pp. 268-275; vol. 129, No. 6/07; Berlin, Germany.

(Continued)

*Primary Examiner* — Helal A Algahaim
(74) *Attorney, Agent, or Firm* — Barnes & Thornburg LLP

(57) ABSTRACT

A method for monitoring the state of components of a railway vehicle, wherein sensors for capturing loads acting on the components are operated, the measurement values thereof are fed as input values to an analysis unit for analyzing the wear state, wherein the current position of the railway vehicle is processed as a signal to this end, wherein the current velocity of the railway vehicle is recorded over time, from which a v-t profile is generated and compared to a stored v-t profile in order to determine the current position as a further input value for monitoring the state by stochastically comparing both profiles.

11 Claims, 1 Drawing Sheet

(56) References Cited

U.S. PATENT DOCUMENTS

| | | | |
|---|---|---|---|
| 8,473,128 B2* | 6/2013 | Oldknow et al. | 701/19 |
| 2007/0112482 A1* | 5/2007 | Kane et al. | 701/19 |
| 2010/0204857 A1* | 8/2010 | Forrest et al. | 701/19 |
| 2012/0016542 A1* | 1/2012 | Severson | 701/19 |
| 2012/0150370 A1* | 6/2012 | Oldknow et al. | 701/19 |

FOREIGN PATENT DOCUMENTS

| | | |
|---|---|---|
| DE | 10233527 B4 | 2/2004 |
| DE | 60118501 T2 | 11/2006 |
| EP | 0795454 A1 | 9/1997 |
| EP | 1213202 A1 | 6/2002 |
| EP | 1264754 A1 | 12/2002 |
| EP | 1523436 B1 | 4/2005 |

OTHER PUBLICATIONS

Search Report for International Patent Application No. PCT/EP2010/061469; Jan. 27, 2011.

Notification of Transmittal of International Preliminary Report on Patentability for International Application No. PCT/EP2010/061469 and Written Opinion.

English Translation of the International Preliminary Report on Patentability for International Application No. No. PCT/EP2010/061469 and Written Opinion.

* cited by examiner

METHOD AND ELECTRONIC DEVICE FOR MONITORING THE STATE OF COMPONENTS OF RAILWAY VEHICLES

PRIORITY CLAIM

This patent application is a U.S. National Phase of International Patent Application No. PCT/EP2010/061469, filed 6 Aug. 2010, which claims priority to German Patent Application No. 10 2009 037 637.2, filed 14 Aug. 2009, the disclosures of which are incorporated herein by reference in their entirety.

FIELD

Disclosed embodiments relate to a method and an electronic device for state monitoring of components of a rail vehicle, in which sensors are operated in order to detect loads acting on the components, the measured values of which loads are passed as input values to an evaluation unit for analysis of the wear state of the components, with the current position of the rail vehicle also being signal-processed for this purpose. Disclosed embodiments relate furthermore to a computer program product in conjunction with this.

BACKGROUND

Diagnosis and monitoring systems, in which widely differing measurement variables are detected, assessed and stored, are being increasingly used for rail vehicle traffic. Inter alia, nowadays, in addition to the detection of the measurement variables of the drive and braking system, such as speeds, pressures, currents and voltages, which are required for operation of the rail vehicle, evermore measured values are being detected and stored for diagnosis of individual subsystems and components. The background in this case is that, in addition to ensuring the required functionality, better assessment of the wear state of components can be carried out, in order to better utilize their life.

In operation, a rail vehicle cannot be considered as an intrinsically closed system. This is because it is always influenced by the interaction with the respective track section. The environmental conditions and, of course, the track state, in particular adhesion in the wheel-rail contact or rail damage, can also be deduced by detection of various measurement variables in the vehicle, such as temperatures and accelerations. The knowledge of the position and therefore an association with a defined point on a track section are in this case directly assumed. At the moment, additional appliances are required for this purpose, which provide the required position information.

DE 102 33 527 B4 discloses a method for state diagnosis and monitoring of components of a rail vehicle, specifically wheel-set guide apparatuses, in which a position signal is estimated by evaluation of a currently measured acceleration signal and its double integration. This position signal is then used as a state variable for description of a coordinate of the current spatial position of the respective wheel set with respect to other components.

Furthermore EP 0 795 454 A1 discloses a method for a track-guided vehicle to locate itself, which is based on a correlation of acceleration spectra, determined on a position-dependent basis, of a current journey and a previous journey of the rail vehicle. In this case, the acceleration spectra represent a shaking profile for the track section, which is specific for the track section being travelled on and for a specific vehicle, and which is stored in an internal database in the form of a reference memory, and is correlated with currently measured acceleration spectra for position determination of the rail vehicle.

Furthermore, DE 601 18 501 D2 discloses a method and an apparatus for location of a rail vehicle, in which the speed of the vehicle on a rail section is determined at different times, and the current position of the rail vehicle is determined on the basis of a calculation, based on a specific algorithm using a database. In this case, in addition to geometric features, further data is stored in this database, which data has been recorded by measurement of an inertia variable from the vehicle previously travelling along that route.

DE 198 36 081 A1 discloses a technical solution for early identification of damage to rail vehicles. This state monitoring is based on an analysis of unusual noise or oscillations, which indicate damage to the rail vehicle. Sensors monitor those components which are subject to particular loads, such as wheel sets. The sensors produce current sound and oscillation values, which are compared with appropriate reference values in order to determine whether they are within predetermined limits. These reference values are stored in a reference memory, having previously been determined from a multiplicity of corresponding current measured values. The reference values apply to the respective track section points at which they were previously obtained. In order to create a reference between the current sound and oscillation values and the corresponding reference values, the reference values are called up repeatedly, to be precise whenever the sensors or vehicle components pass the relevant track section point, and generate the current sensor messages. The current sensor signals are associated with the corresponding reference signals by read pointers, which can be preselected in accordance with forward movement of the vehicle on the track section.

In the prior art, use is made of additional appliances, such as GPS receivers (GPS=Global Position System), in order to obtain the position information.

This prior art has the disadvantage that the GPS signal is not always available in the rail vehicle and, even when present, does not always produce a usable signal, for example when travelling through tunnels, which may run over long distances in mountainous terrain. Furthermore, there are only restricted transmission and reception capabilities in many networks, such as underground systems, by virtue of the system, and GPS location can therefore be used only to a highly restricted extent.

In order to overcome this problem, another possibility is known from the general prior art for determination of the current position of the rail vehicle, in which inductively acting position marks which are incorporated in the track section directly transmit the information relating to defined waypoints to the rail vehicle.

However, this technical solution also requires additional hardware complexity, which must be planned in during the design of the rail vehicle and of the track section.

SUMMARY

Disclosed embodiments therefore provide a method and an electronic device for state monitoring of components, in which position data is obtained in a simple manner, and reliably.

This is achieved based on the claimed method and claimed electronic device, and computer program product.

Disclosed embodiments include the method teaching and the current speed v of the rail vehicle is recorded over the time t from which a v-t profile is created, which is correlated with a stored v-t profile in order to determine the current position of the rail vehicle for state monitoring, by stochastic matching of the two profiles. In this case, correlation is expediently carried out with a stored v-t profile in the form of a track section/stopping point profile.

In other words, the fundamental idea of the disclosed embodiments is to determine position by means of a correlation of the speed profile with the track section/stopping point profile.

In particular, utility of the solution according to the disclosed embodiments may be that no further technical appliances are required for supplying position data to the evaluation unit for state monitoring and wear state analysis of components and of the track section. In fact, position information is obtained, that is to say calculated, exclusively by signal processing. Because rail vehicles generally travel on fixed track sections with fixed stopping points, it is possible to derive the association criteria on which the disclosed embodiments are based. The evaluation unit can use the profile of the stopping times, when placed over a map in the form of data, to determine the track section on which the rail vehicle is travelling and approximately where it is located, how often it has been delayed between the stopping points, and where, for example, points with generally poor adhesion are located in the track bed. Stopping times correspond to stopping point positions, at which the speed is zero, while stopping at the stopping point in accordance with the time table. In this way, it is possible to create data records which can be evaluated by means of simple statistical methods for state monitoring.

Within the scope of the disclose embodiments, it is also feasible that further load data, which is determined by sensors and acts on the components, is associated, in terms of data records, with the stored v-t profile. For example, the accelerations acting on the wheel sets of the rail vehicle can be recorded as further load data, in order in this way to identify faulty track sections. It is even possible to create a prediction as to when, for example, a faulty track section would have reached a wear limit, and this information can be used to preventively improve faulty track sections even before they fail totally, and well before complex technical repairs are required.

One measure which represents an improvement proposes that the central data logger, which is provided in the rail vehicle in any case, be used as the recording appliance for the current speed of the rail vehicle over time. This results in a further hardware saving. The central data logger in a rail vehicle is designed to record, measure and calculate vehicle data along its time profile. An additional proposal is that the track section/stopping point profile which is used for the comparison purposes according to the disclosed embodiments in the rail vehicle likewise be stored in the data logger or in the evaluation unit for state monitoring. In the simplest case, the track section/stopping point profile includes the time profile of the speed of the rail vehicle along its route in accordance with the applicable timetable taking account of speed limits on the track section. In addition, it is also possible to determine a track section/stopping point profile by statistical analysis of historic measured v-t profiles.

BRIEF DESCRIPTION OF THE FIGURES

Further measures which improve the disclosed embodiments will be described in more detail in the following text together with the description of one exemplary embodiment and with reference to the figures, in which.

DETAILED DESCRIPTION

Figure 1:
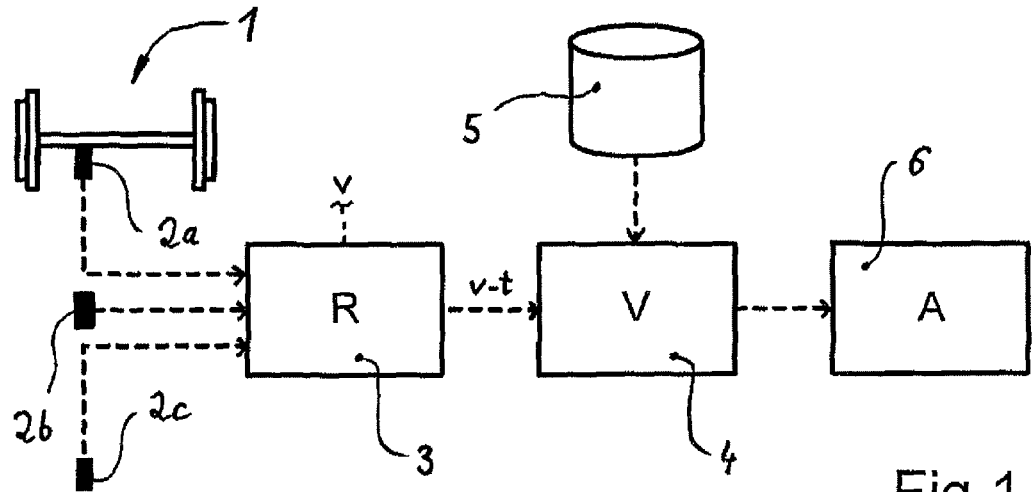
FIG. 1 shows a schematic block diagram of an electronic device for state monitoring.

As shown in FIG. 1, an electronic device for state monitoring of components 1 of a rail vehicle—which is not illustrated in any more detail—essentially consists of a plurality of sensors 2a-2c, which detects loads acting on the components 1. By way of example, the sensor 2a is in this case in the form of an acceleration sensor, which detects the shocks acting on a wheel set, as the component 1, during the journey.

The measured values obtained in this way are passed as input values first of all to a recording unit 3, which obtains the current speed v of the rail vehicle from a controller—which is not illustrated in any more detail—and records this over the time t. The recording unit 3 uses this to create a v-t profile of the rail vehicle, which is passed as an input signal to a downstream comparison unit 4. The comparison unit 4 obtains from a memory unit 5 a v-t profile stored there, in the form of a track section/stopping point profile of the rail vehicle, which was determined on the basis of the timetable for the current track section. Stochastic matching of the two profiles is used to determine matches, which the comparison unit 4 makes available to a downstream evaluation unit 6.

The evaluation unit 6 is used for state monitoring and for analysis of the wear state of components 1 of the rail vehicle.

Figure 2:
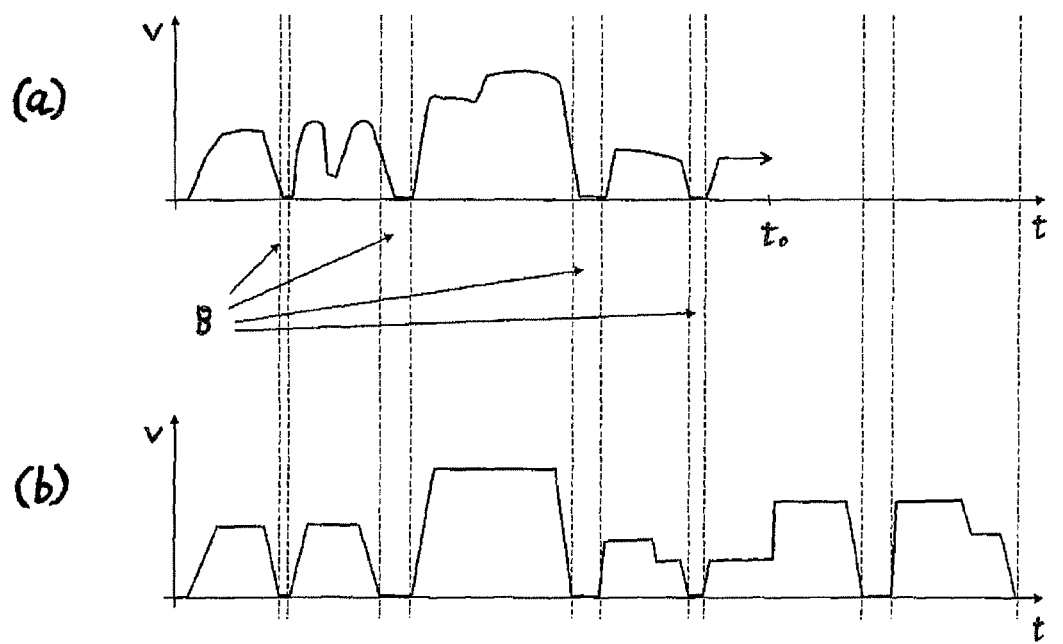
FIG. 2 shows an illustration, in the form of a graph, of the comparison between a v-t profile and the stored track section/stopping point profile of the rail vehicle.

As is illustrated in FIG. 2, the v-t profile a is compared with the track section/stopping point profile (b) by determining matches over the course of the time t in the area B identified by the dashed lines. In this case, the area B indicates times when the rail vehicle is stationary, when the speed v is equal to zero. Such coincidence of the two profiles can be used in conjunction with the reference profile (b) to determine the position at which the rail vehicle is currently located at the instantaneous time $t_0$. The current rail vehicle position obtained in this way can be used by the evaluation unit 6 for position-based state monitoring, including the measured values obtained via the sensors 2a-2c.

LIST OF REFERENCE SYMBOLS

1 Component
2 Sensor
3 Recording unit
4 Comparison unit
5 Memory unit
6 Evaluation unit
a v-t profile (speed-time profile)
b Track section/stopping point profile
t Time
$t_0$ Current time
v Speed
B Area

The invention claimed is:

1. A method for state monitoring of components of a rail vehicle, the method comprising:
   operating sensors to detect loads acting on the components;
   inputting measured values of which loads into an evaluation unit for analysis of a wear state of the components along with a current position of the rail vehicle;
   recording a current speed (v) of the rail vehicle over a period of time (t) from which a current v-t profile (a) is created; and correlating the current v-t profile with a stored v-t profile to determine the current position of the rail vehicle by stochastic matching of the two v-t profiles.

2. The method of claim 1, wherein correlation is carried out with a stored v-t profile in the form of a track section/stopping point profile.

3. The method of claim 2, wherein the correlation of the two v-t profiles is carried out based on a time sequence of stopping-point positions at which speed is zero over a defined time period.

4. The method of claim 1, further comprising determining further load data by the sensors; and associating acts on the components with the stored v-t profile in terms of data records.

5. The method of claim 4, further comprising recording accelerations acting on wheel sets of the rail vehicle as further load data to identify faulty track sections.

6. An electronic device for state monitoring of components of a rail vehicle, the electronic device comprising:

sensors operated to detect loads acting on the components, an evaluation unit that receives measured values from the sensors regarding the detected loads as input values along with a signal that indicates a current position of the rail vehicle, wherein the evaluation unit analyzes a wear state of the components;

a recording unit that records a current speed (v) of the rail vehicle over a period of time (t) and creates a current v-t profile; and a comparison unit that compares the current v-t profile with a stored v-t profile to determine the current position of the vehicle for input to the evaluation unit by stochastic matching of the two profiles.

7. The electronic device of claim 6, wherein the stored v-t profile is a track section/stopping point profile.

8. The electronic device of claim 6, wherein the recording unit is implemented using a central data logger of the rail vehicle.

9. The electronic device of claim 8, wherein the stored v-t profile is stored in the recording unit or in the evaluation unit.

10. A rail vehicle having an electronic device as claimed in claim 6.

11. A computer program product for an electronic device as claimed in claim 6, the computer program product being stored in a data storage medium, the computer program product being operated according to a routine for state monitoring of the components being implemented by appropriate control commands stored in software to:

operate the sensors to detect the loads acting on the components;

input measured values of which loads into the evaluation unit for analysis of the wear state of the components along with the current position of the rail vehicle;

record the current speed (v) of the rail vehicle over the period of time (t) from which the current v-t profile (a) is created; and correlate the current v-t profile with the stored v-t profile to determine the current position of the rail vehicle by stochastic matching of the two v-t profiles.

* * * * *